United States Patent
Weaver et al.

(10) Patent No.: US 6,766,081 B2
(45) Date of Patent: Jul. 20, 2004

(54) FOCAL LENGTH DISPERSION COMPENSATION FOR FIELD CURVATURE

(75) Inventors: Samuel P. Weaver, Boulder, CO (US); Raymond F. Cahill, Boulder, CO (US)

(73) Assignee: PTS Corporation, San Jose, CA (US)

( * ) Notice: Subject to any disclaimer, the term of this patent is extended or adjusted under 35 U.S.C. 154(b) by 519 days.

(21) Appl. No.: 09/782,882

(22) Filed: Feb. 13, 2001

(65) Prior Publication Data

US 2004/0105619 A1 Jun. 3, 2004

(51) Int. Cl.$^7$ ............................. G02B 6/32; H04J 14/02
(52) U.S. Cl. ............................. 385/39; 385/33; 398/81; 398/88
(58) Field of Search ............................. 385/31, 33, 39, 385/47, 15, 35, 37; 398/79, 81–82, 88

(56) References Cited

U.S. PATENT DOCUMENTS

| | | | |
|---|---|---|---|
| 5,414,540 A | 5/1995 | Patel | 359/39 |
| 5,917,625 A | 6/1999 | Ogusu et al. | 359/130 |
| 5,960,133 A | 9/1999 | Tomlinson | 385/18 |
| 5,999,672 A | 12/1999 | Hunter et al. | 385/37 |
| 6,097,519 A | 8/2000 | Ford et al. | 359/130 |
| 6,097,859 A | 8/2000 | Solgaard et al. | 385/17 |
| 6,108,471 A | 8/2000 | Zhang et al. | 385/37 |
| 6,307,657 B1 | 10/2001 | Ford | |
| 6,501,877 B1 * | 12/2002 | Weverka et al. | 385/31 |

OTHER PUBLICATIONS

U.S. patent application Ser. No. 09/442,061, Weverka, filed Nov. 16, 1999.

Sun, et al., "Demultiplexer with 120 Channels and 0.29–nm Channel Spacing," IEEE Photonics Technology Letters, vol. 10, No. 1, Jan. 1998, pp. 90–92.

(List continued on next page.)

*Primary Examiner*—Akm Enayet Ullah
*Assistant Examiner*—Jerry T Rahll
(74) *Attorney, Agent, or Firm*—Townsend and Townsend and Crew LLP (57) ABSTRACT

An optical arrangement and method are provided for receiving a light beam having a plurality of spectral bands and directing subsets of the spectral bands along optical paths to respective optical elements. The light beam is received at an input port. The optical elements which route the spectral bands are configured as a substantially planar array. A dispersive element is configured to angularly spread the light beam, after it has been collimated, into a plurality of angularly separated beams that correspond to the plurality of spectral bands. A first focusing element is disposed with respect to the dispersive element and with respect to the array of optical elements such that variation of focal length with wavelength of the separated beams is compensated by the field curvature of the optical system, and the final image surface is flattened.

50 Claims, 7 Drawing Sheets

OTHER PUBLICATIONS

Nishi, et al., "Broad–Passband–Width Optical filter for Multi/Demultiplexer Using a Diffraction Grating and a Retroreflector Prism," Electronics Letters, vol. 21, No. 10, May 9, 1985, pp. 423–424.

Philippe, et al., "Wavelength demultiplexer: using echelette gratings on silicon substrate," Applied Optics, vol. 24, No. 7, Apr. 1985, pp. 1006–1011.

Ford, et al., "Wavelength Add–Drop Switching Using Tilting Micromirrors," Journal of Lightwave Technology, vol. 17, No. 5, May 1999, pp. 904–911.

"Low Voltage Piezoelectric Stacks," Transducer Elements, Catalog #3 1998, pp. 30–45, Piezo Systems, Inc. Cambridge, MA 02139.

Grade, John D. et al., "A Large–Deflection Electrostatic Actuator For Optical Switching Applications," Solid–State and Actuator Workshop, Hilton Head Island, SC, pp. 97–100 (Jun. 2000).

Rallison, R.D., "Dense Wavelength Division Multiplexing (DWDM) and the Dickson Grating," White Paper, Jan. 6, 2001.

* cited by examiner

FOCAL LENGTH DISPERSION COMPENSATION FOR FIELD CURVATURE

BACKGROUND OF THE INVENTION

This application relates generally to optical lensing and more specifically to techniques and devices for routing optical signals.

The Internet and data communications are causing an explosion in the global demand for bandwidth. Fiber optic telecommunications systems are currently deploying a relatively new technology called dense wavelength division multiplexing (DWDM) to expand the capacity of new and existing optical fiber systems to help satisfy this demand. In DWDM, multiple wavelengths of light simultaneously transport information through a single optical fiber. Each wavelength operates as an individual channel carrying a stream of data. The carrying capacity of a fiber is multiplied by the number of DWDM channels used. Today DWDM systems employing up to 80 channels are available from multiple manufacturers, with more promised in the future.

In all telecommunication networks, there is the need to connect individual channels (or circuits) to individual destination points, such as an end customer or to another network. Systems that perform these functions are called cross-connects. Additionally, there is the need to add or drop particular channels at an intermediate point. Systems that perform these functions are called add-drop multiplexers (ADMs). All of these networking functions are currently performed by electronics—typically an electronic SONET/SDH system. However SONET/SDH systems are designed to process only a single optical channel. Multi-wavelength systems would require multiple SONET/SDH systems operating in parallel to process the many optical channels. This makes it difficult and expensive to scale DWDM networks using SONET/SDH technology.

The alternative is an all-optical network. Optical networks designed to operate at the wavelength level are commonly called "wavelength routing networks" or "optical transport networks" (OTN). In a wavelength routing network, the individual wavelengths in a DWDM fiber must be manageable. New types of photonic network elements operating at the wavelength level are required to perform the cross-connect, ADM and other network switching functions. Two of the primary functions are optical add-drop multiplexers (OADM) and wavelength-selective cross-connects (WSXC).

In order to perform wavelength routing functions optically today, the light stream must first be de-multiplexed or filtered into its many individual wavelengths, each on an individual optical fiber. Then each individual wavelength must be directed toward its target fiber using a large array of optical switches commonly called an optical cross-connect (OXC). Finally, all of the wavelengths must be re-multiplexed before continuing on through the destination fiber. This compound process is complex, very expensive, decreases system reliability and complicates system management. The OXC in particular is a technical challenge. A typical 40–80-channel DWDM system will require thousands of switches to fully cross-connect all the wavelengths. Opto-mechanical switches, which offer acceptable optical specifications, are too big, expensive and unreliable for widespread deployment. New integrated solid-state technologies based on new materials are being researched, but are still far from commercial application.

Consequently, the industry is aggressively searching for an all-optical wavelength routing solution that enables cost-effective and reliable implementation of high-wavelength-count systems.

SUMMARY OF THE INVENTION

Embodiments of the invention are directed to an optical arrangement and method for receiving a light beam having a plurality of spectral bands and directing subsets of the spectral bands along optical paths to respective optical elements. The light beam is received at an input port. The optical elements which route the spectral bands are configured as a substantially planar array. A dispersive element is configured to angularly spread the light beam, after it has been collimated, into a plurality of angularly separated beams that correspond to the plurality of spectral bands. A first focusing element is disposed with respect to the dispersive element and with respect to the array of optical elements such that variation of focal length with wavelength of the separated beams is compensated by the field curvature of the optical system, and the final image surface is flattened. Different embodiments are adapted for positive and negative field curvature aberrations.

In certain embodiments, the dispersive element is a reflective diffraction grating. The first focusing element may be further disposed with respect to the reflective diffraction grating to collimate the light beam before the light beam encounters the reflective diffraction grating. In such embodiments, the first focusing element may be, for example, a lens disposed between the input port and the reflective diffraction grating or a curved mirror disposed to intercept light from the input port. In one embodiment, the input port is substantially coplanar with the array of optical elements. For a positive field curvature aberration, the input port may thus be positioned proximate the optical element corresponding to the shortest-wavelength spectral band, with optical elements corresponding to progressively longer-wavelength spectral bands positioned progressively farther from the input port. For a negative field curvature aberration, the input port may be positioned proximate the optical element corresponding to the longest-wavelength spectral band, with optical elements corresponding to progressively shorter-wavelength spectral bands positioned progressively farther from the input port.

In other embodiments, the dispersive element is a transmissive diffraction grating. A second focusing element is disposed with respect to the transmissive diffraction grating to collimate the light beam before the light beam encounters the transmissive diffraction grating. The first and second focusing elements may have a common symmetry axis that is substantially orthogonal to the array of optical elements. The input port may be positioned within a plane parallel to the array of optical elements. For a positive field curvature aberration, the input port may be displaced from the symmetry axis by an amount substantially equal to a displacement from the symmetry axis by the optical element corresponding to the shortest-wavelength spectral band; the optical elements corresponding to progressively longer-wavelength spectral bands may thus be progressively farther from the optical element corresponding to the shortest-wavelength spectral band. For a negative field curvature aberration, the input port may instead be displaced from the symmetry axis by an amount substantially equal to a displacement from the symmetry axis by the optical element corresponding to the longest-wavelength spectral band; the optical elements corresponding to progressively shorter-wavelength spectral bands may thus be progressively farther from the optical element corresponding to the longest-wavelength spectral band. In one embodiment, the first focusing element is a lens disposed between the transmissive diffraction grating and the array of optical elements and the second focusing element is a lens disposed between the input port and the transmissive diffraction grating.

In still other embodiments, the dispersive element is a prism. A second focusing element may be disposed with respect to the prism to collimate the light beam before the light beam encounters the prism. Alternatively, the dispersive element may be a grism.

The array of optical elements may comprise an array of routing elements. In one embodiment, each such routing element is dynamically configurable to direct a given angularly separated beam to different output ports depending on its state. In alternative embodiments, the array of optical elements comprises an array of detector elements.

In certain embodiments, the dispersive element is angularly positioned with respect to the first focusing element to minimize the field curvature aberration. In other embodiments, the first focusing element is designed to have a specific field curvature aberration based on an angular position of the dispersive element with respect to the first focusing element.

Embodiments of the invention may be incorporated in a wavelength router. Such a wavelength router is configured to receive, at an input port, light having a plurality of spectral bands and to direct subsets of the spectral bands to respective ones of a plurality of output ports. A routing mechanism is provided having a substantially planar array of dynamically configurable routing elements, each of which is structured to direct a given spectral band to different output ports, depending on its state. A free-space optical train included a dispersive element and focusing element forming an optical arrangement as described above is disposed between the input port and the output ports to provide optical paths for routing the spectral bands.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and is enclosed in parentheses to denote one of multiple similar components. When reference is made to a reference numeral without specification to an existing sublabel, it is intended to refer to all such multiple similar components.

DESCRIPTION OF THE SPECIFIC EMBODIMENTS

1. Introduction

The following description sets forth embodiments of an optical switch for use in an optical wavelength router according to the invention Embodiments of the invention can be applied to network elements such as optical add-drop multiplexers (OADMs) and wavelength-selective cross-connects (WSXCs), among others, to achieve the goals of optical networking systems.

The general functionality of one optical wavelength router that can be used with the embodiments of the invention is described in detail in the copending, commonly assigned United States Patent Application, filed Nov. 16, 1999 and assigned Ser. No. 09/442,061, entitled "Wavelength Router," which is herein incorporated by reference in its entirety, including the Appendix, for all purposes. As described therein, such an optical wavelength router accepts light having a plurality of spectral bands at an input port and selectively directs subsets of the spectral bands to desired ones of a plurality of output ports. As used herein, the terms "input port" and "output port" are intended to have broad meanings. At the broadest, a port is defined by a point where light enters or leaves the optical router. For example, the input (or output) port could be the location of a light source (or detector) or the location of the downstream end of an input fiber (or the upstream end of an output fiber).

The wavelength router thus includes a dispersive element, such as a diffraction grating or prism, which operates to deflect incoming light by a wavelength-dependent amount. Different portions of the deflected light are intercepted by different routing elements. The International Telecommunications Union (ITU) has defined a standard wavelength grid having a frequency band centered at 193,100 GHz, and another band at every 100 GHz interval around 193,100 GHz. This corresponds to a wavelength spacing of approximately 0.8 nm around a center wavelength of approximately 1550 nm, it being understood that the grid is uniform in frequency and only approximately uniform in wavelength. The ITU has also defined standard data modulation rates. The OC-48 modulation corresponds to approximately 2.5 GHz, OC-192 to approximately 10 GHz, and OC-768 to approximately 40 GHz.

2. Wavelength Router Configurations

Figure 1A:
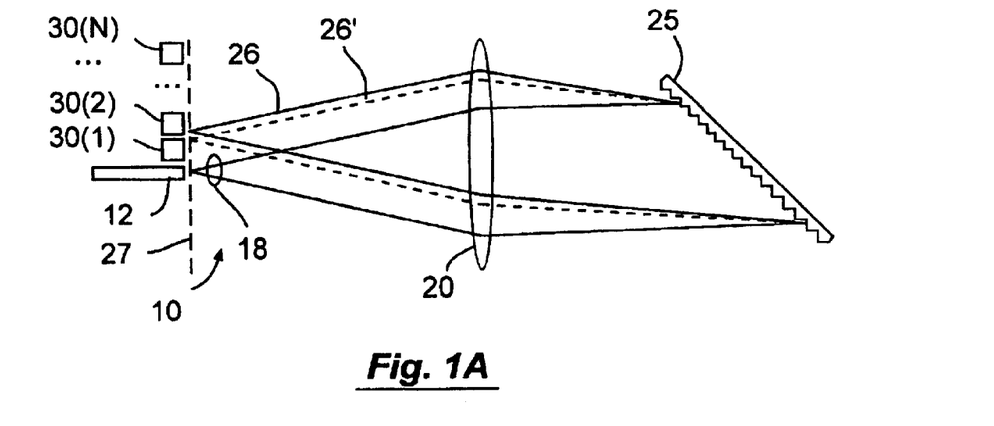
FIGS. 1A, 1B, and 1C are schematic top, side, and end views, respectively, of one embodiment of a wavelength router that uses spherical focusing elements.
Figure 1B:
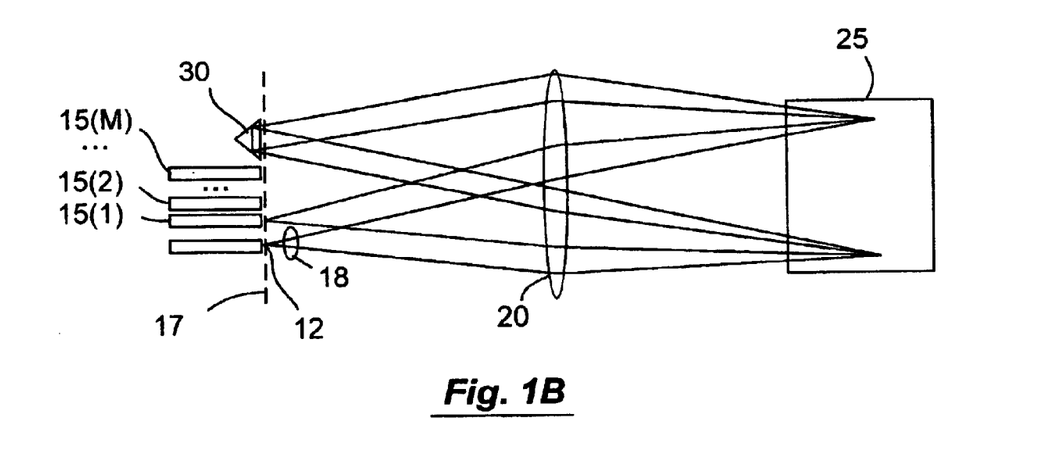
Figure 1C:
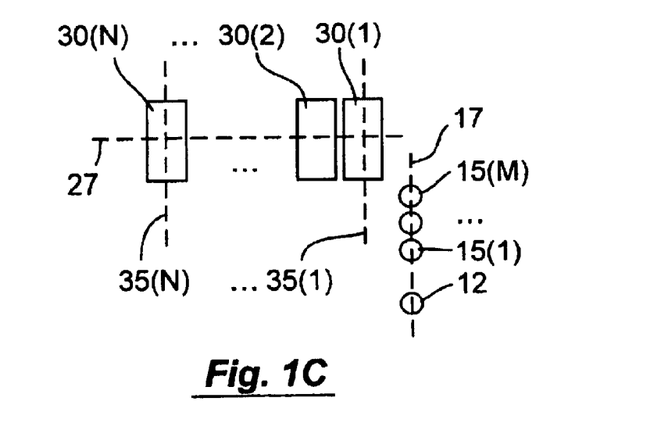

FIGS. 1A, 1B, and 1C are schematic top, side, and end views, respectively of one embodiment of a wavelength router 10. Its general functionality is to accept light having a plurality N of spectral bands at an input port 12, and to direct subsets of the spectral bands to desired ones of a plurality M of output ports, designated 15(1) . . . 15(M). The output ports are shown in the end view of FIG. 1C as disposed along a line 17 that extends generally perpendicular to the top view of FIG. 1A. Light entering the wavelength router 10 from input port 12 forms a diverging beam 18, which includes the different spectral bands. Beam 18 encounters a lens 20 that collimates the light and directs it to a reflective diffraction grating 25. The grating 25 disperses the light so that collimated beams at different wavelengths are directed at different angles back towards the lens 20.

Two such beams are shown explicitly and denoted 26 and 26', the latter drawn in dashed lines. Since these collimated beams encounter the lens 20 at different angles, they are focused towards different points along a line 27 in a transverse plane extending in the plane of the top view of FIG. 1A. The focused beams encounter respective ones of a plurality 42 of retroreflectors, designated 30(1) . . . 30(N), located near the transverse plane. The beams are directed back, as diverging beams, to the lens 20 where they are collimated, and directed again to the grating 25. On the second encounter with the grating 25, the angular separation between the different beams is removed and they are directed back to the lens 20, which focuses them. The retroreflectors 30 may be configured to send their intercepted beams along a reverse path displaced along respective lines 35(1) . . . 35(N) that extend generally parallel to line 17 in the plane of the side view of FIG. 1B and the end view of FIG. 1C, thereby directing each beam to one or another of output ports 15.

Figure 2A:
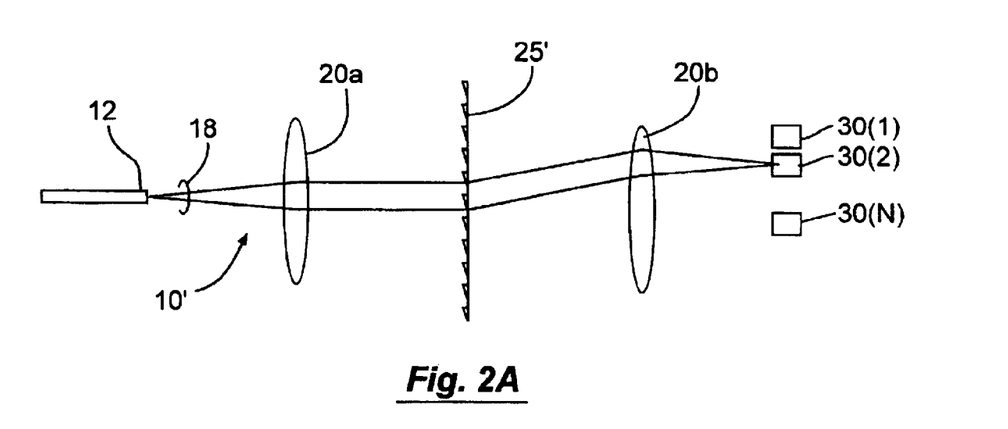
FIGS. 2A and 2B are schematic top and side views, respectively, of a second embodiment of a wavelength router that uses spherical focusing elements.
Figure 2B:
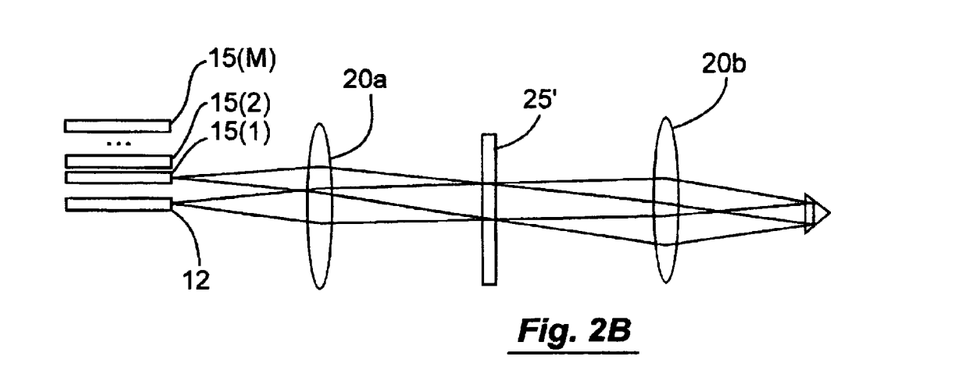

Another embodiment of a wavelength router, designated 10', is illustrated with schematic top and side views in FIGS. 2A and 2B, respectively. This embodiment may be considered an unfolded version of the embodiment of FIGS. 1A–1C. Light entering the wavelength router 10' from input port 12 forms diverging beam 18, which includes the different spectral bands. Beam 18 encounters a first lens 20a, which collimates the light and directs it to a transmissive grating 25'. The grating 25' disperses the light so that collimated beams at different wavelengths encounter a second lens 20b, which focuses the beams. The focused beams are reflected by respective ones of plurality of retroreflectors 30 as diverging beams, back to lens 20b, which collimates them and directs them to grating 25'. On the second encounter, the grating 25' removes the angular separation between the different beams, which are then focused in the plane of output ports 15 by lens 20a.

Figure 3:
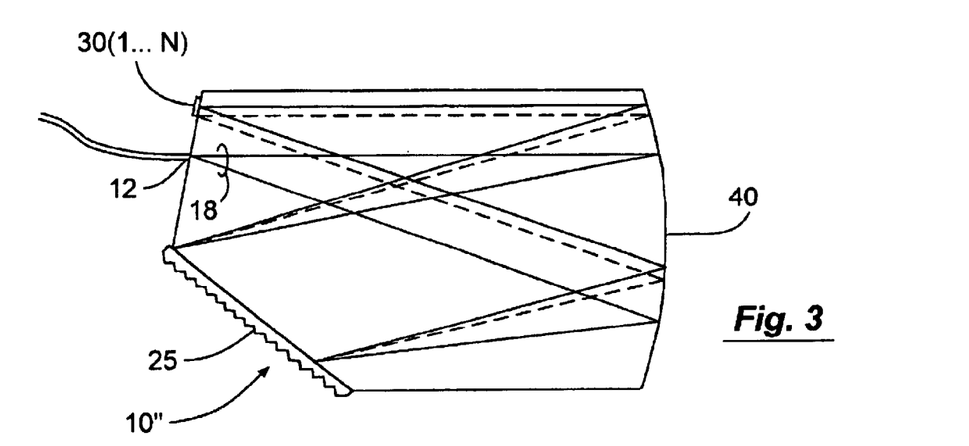
FIG. 3 is a schematic top view of a third embodiment of a wavelength router that uses spherical focusing elements.

A third embodiment of a wavelength router, designated 10", is illustrated with the schematic top view shown in FIG. 3. This embodiment is a further folded version of the embodiment of FIGS. 1A–1C, shown as a solid glass embodiment that uses a concave reflector 40 in place of lens 20 of FIGS. 1A–1C or lenses 20a and 20b of FIGS. 2A–2B. Light entering the wavelength router 10" from input port 12 forms diverging beam 18, which includes the different spectral bands. Beam 18 encounters concave reflector 40, which collimates the light and directs it to reflective diffraction grating 25, where it is dispersed so that collimated beams at different wavelengths are directed at different angles back towards concave reflector 40. Two such beams are shown explicitly, one in solid lines and one in dashed lines. The beams then encounter retroreflectors 30 and proceed on a return path, encountering concave reflector 40, reflective grating 25', and concave reflector 40, the final encounter with which focuses the beams to the desired output ports.

3. Lens Field Curvature

The use of real lenses in the wavelength routers necessarily introduces some level of optical aberration into the system. One known optical aberration that results from the use of lenses that have curved surfaces is field curvature (sometimes also called Petzval curvature after the Hungarian mathematician who is known for studying its properties). When object points lying within an object plane are imaged through a lens having curved surfaces, they may not all be focused in a single image plane. Instead, the focal points for different parts of the image are situated at a longitudinal distance from the paraxial image. The longitudinal displacement of the focus is proportional to the square of the image height, thereby producing a field curvature without any loss of definition. In effect, the image plane is distorted into a portion of a spherical surface, the nominal curvature of which is equal to the reciprocal of the lens radius.

Figure 4A:
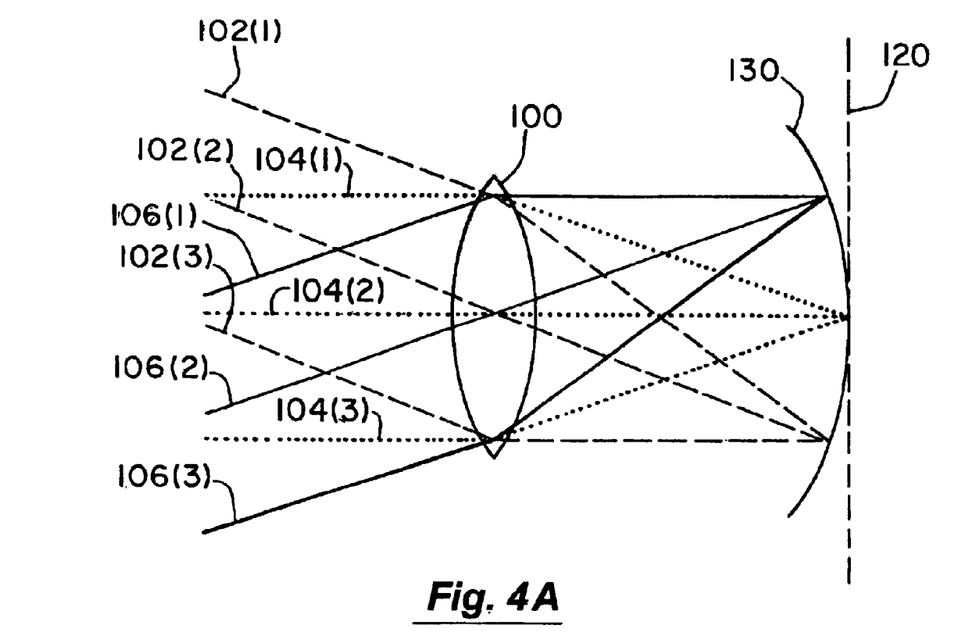
FIG. 4A is a schematic diagram illustrating the effect of positive field curvature from a refractive lens.
Figure 4B:
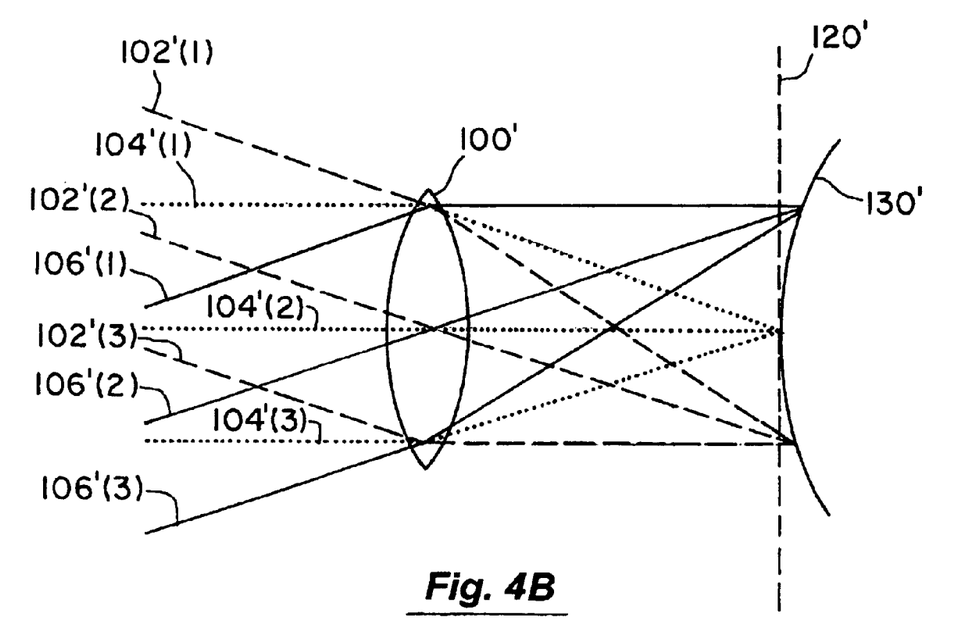
FIG. 4B is a schematic diagram illustrating the effect of negative field curvature from a refractive lens.

The effect of field curvature is illustrated for a lens with an object at infinity in FIGS. 4A and 4B. In FIG. 4A, the field curvature is positive. The focal point of each of three sets of parallel rays 102, 104, and 106 through lens 100 is shown. Rather than being focused onto an image plane 120, the object at infinity is focused onto the spherically curved surface 130. Rays 104 parallel to the optical axis of the lens 100 are focused onto the image plane, but the deviation of the focus from the image plane 120 increases as a result of the positive field curvature is the angle of incidence of the away from the optical axis increases, as shown by rays 102 and 106. For a positive field curvature this deviation is towards the lens 100. By contrast, in FIG. 4B the field curvature is negative. In this instance, the focal points through lens 100' moves away from the image plane 120' and onto the spherically curved surface 130' as a result of the field curvature. This is illustrated with three sets of parallel rays 102', 104', and 106'.

Various methods have been used to compensate for the field curvature. One method is to introduce an overcorrected astigmatism, which may be identified by the distortion of circular objects into elliptical images. While the effect of the overcorrected astigmatism may mitigate the field curvature it has its own undesirable optical aberrations, the effect being simply to trade one optical aberration for another. Another method to reduce field curvature involves arranging a plurality of lens elements, combining relatively strong negative elements having a low index of refraction with positive elements having a high index of refraction. This adds complexity to the optical arrangement and is, in any event, more difficult to implement at infrared wavelengths such as used in telecommunications applications. This is because the readily available glasses at such wavelengths exhibit relatively flat dispersion curves, making it difficult to flatten the focal field of a lens by using different glass types.

4. Focal-field Flattening

Thus, embodiments of the invention use an optical arrangement that includes both a dispersive element for angular separation of a beam and a focusing element to focus the separated beams. The dispersive element and the focusing element are designed and positioned so that the variation of focal length with wavelength of the angularly dispersed images is compensated by the field-dependent curvature of the lens focal plane. In certain embodiments, the angular position of the dispersive element is chosen to minimize the final image field curvature, i.e. flatten the field, for both positive and negative field curvatures. Conversely, if a predetermined angular position of the dispersive element is needed, then the lens may be designed in some embodiments to yield the correct sign of field curvature to minimize the final image curvature, i.e. flatten the field. In this manner, the final image surface curvature is minimized and the field is flattened. The arrangement is particularly useful in applications where the separated beams are to be directed to an array of mirrors or detectors that he in a plane. This arrangement is also very useful when a predetermined focusing element with uncontrolled field curvature must be used. By flattening the focal field of the focusing element so that it more closely matches the plane of the mirrors or detectors, the spot size across each mirror or detector is reduced.

In different embodiments, the dispersive element may be reflective, such as a reflective diffraction grating, or may be transmissive, such as a transmissive diffraction grating, a prism, or a grism. The focusing element may also be transmissive, such as a positive lens, or may be reflective, such as a curved mirror. Various lens configurations may be used, including biconvex, plano-convex, meniscus configurations, and multielement lenses or microsystems. While embodiments of the invention may be adapted for a variety of optical configurations in which angularly separated beams are directed to an array of mirrors of detectors, they are particularly useful in embodiments that use multi-pass configurations. In a multipass configuration, balancing the dispersion in focal length with the field curvature may be particularly effective. In certain of those multipass configurations, the light source is in the same plane as the detectors or mirrors.

Figure 5A:
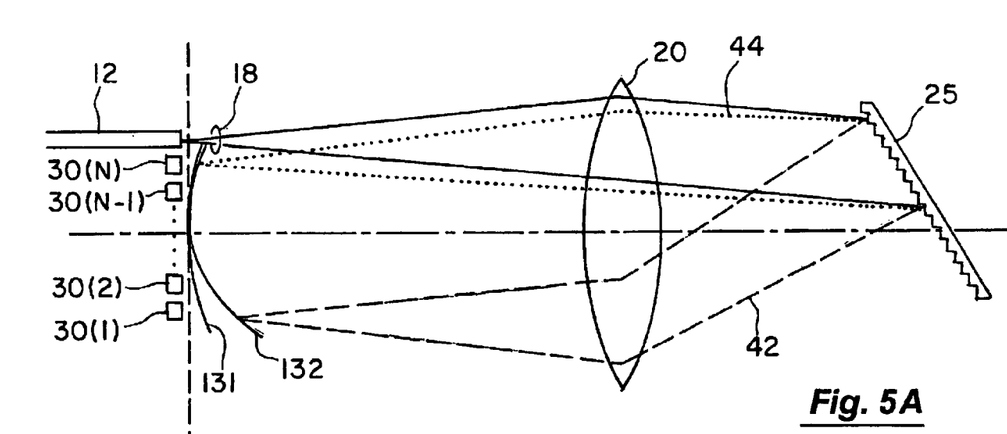
FIG. 5A is a schematic top view of a first embodiment of a wavelength router in which effects from focal length dispersion and positive field curvature act constructively.
Figure 5B:
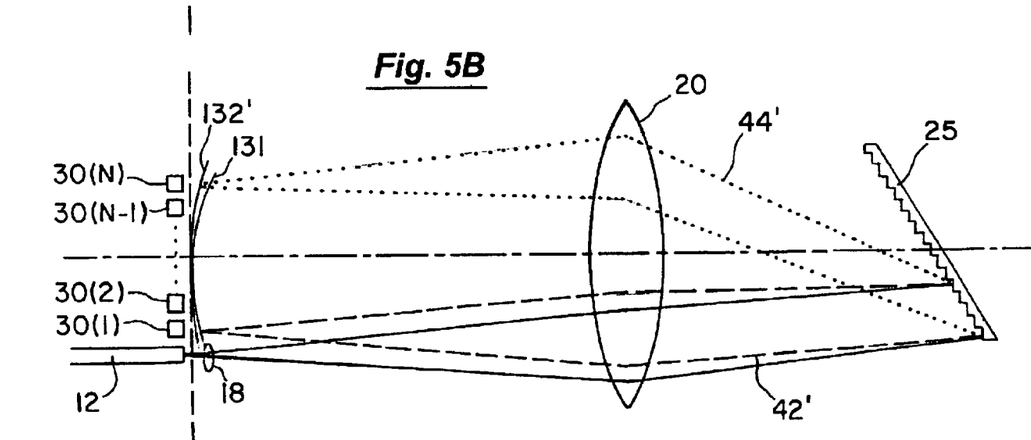
FIG. 5B is a schematic top view of a first embodiment of a wavelength router in which effects from focal length dispersion and positive field curvature compensate for each other.

The wavelength routers described above provide examples of optical configurations where embodiments of the invention are useful, although the invention may also be adopted for other optical configurations. FIGS. 5A–5D, for example, illustrate how balancing focal length dispersion with field curvature may be used in the wavelength router described with respect to FIG. 1A–1C. FIGS. 5A and 5B make such an illustration where the field curvature is positive and FIGS. 5C and 5D make a corresponding illustration where the field curvature is negative. Each of FIGS. 5A–5D schematically show a top view of an arrangement where the input port 12 lies in the same plane as the array of retroreflectors 30. In the illustrated arrangement, the retroreflector at the bottom of the array, labeled 30(1), is used to reflect the spectral band having the shortest wavelength while the retroreflector at the top of the array, labeled 30(N) is used to reflect the spectral band having the longest wavelength. For telecommunications applications, for example, retroreflector 30(1) may be used for signals at ~1530 nm and retroreflector 30(N) may be used for signals at ~1565 nm.

In each of FIGS. 5A–5D, the short-wavelength spectral band is shown in dashed lines (and labeled 42, 42', 42", and 42''' in the respective figures). The long-wavelength spectral band is shown in dotted lines (and labeled 44, 44', 44", and 44''' in the respective figures). In FIGS. 5A and 5B, the monochromatic focal field for positive field curvature is defined by curve 131 and represents the locus of foci for monochromatic rays transmitted through the lens. Similarly, in FIGS. 5C and 5D, the monochromatic focal field for negative field curvature is defined by curve 131".

In FIG. 5A, the input port 12 is positioned in the common input-port/retroreflector plane proximate the longest wavelength retroreflector 30(N). As shown, this has a negative effect on the focal field that results from positive field curvature, distorting it to curve 132 so that foci for the long- and short-wavelength spectral bands are farther apart. By contrast, FIG. 5B illustrates how the focal field is flattened when the input port is instead positioned proximate the shortest wavelength retroreflector 30(1), resulting in a decrease in longitudinal separation for the foci of the long- and short-wavelength spectral bands. The flattened focal field is denoted by curve 132'. When the input port 12 is in the same plane as and proximate the long-wavelength retroreflector 30(N), the effects of focal length dispersion and positive field curvature combine constructively to increase the optical aberration. Conversely, when the input port 12 is in the same plane as and proximate the short-wavelength retroreflector 30(1), the focal-length-dispersion and positive-field-curvature effects compensate for each other to limit the optical aberration.

Figure 5C:
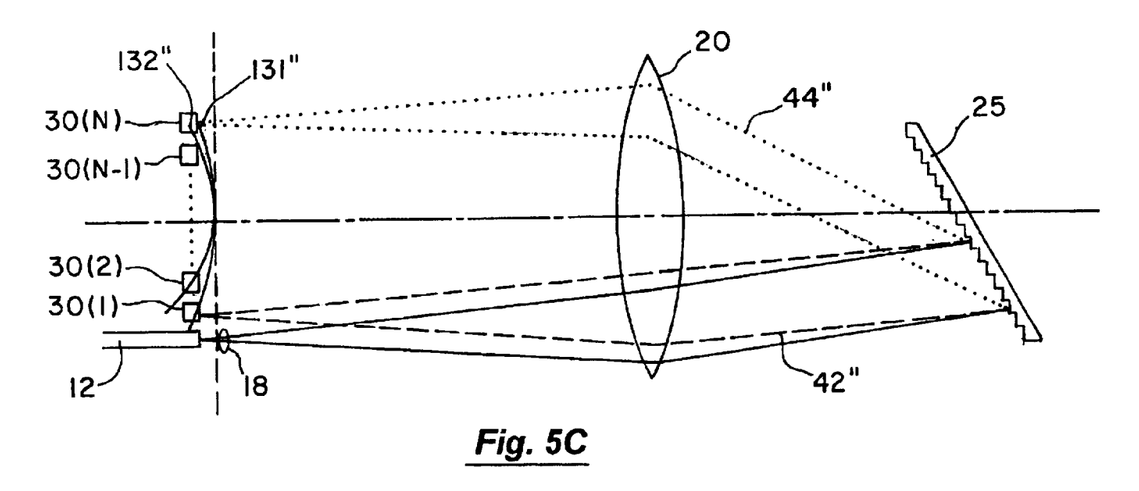
FIG. 5C is a schematic top view of a first embodiment of a wavelength router in which effects from focal length dispersion and negative field curvature act constructively.
Figure 5D:
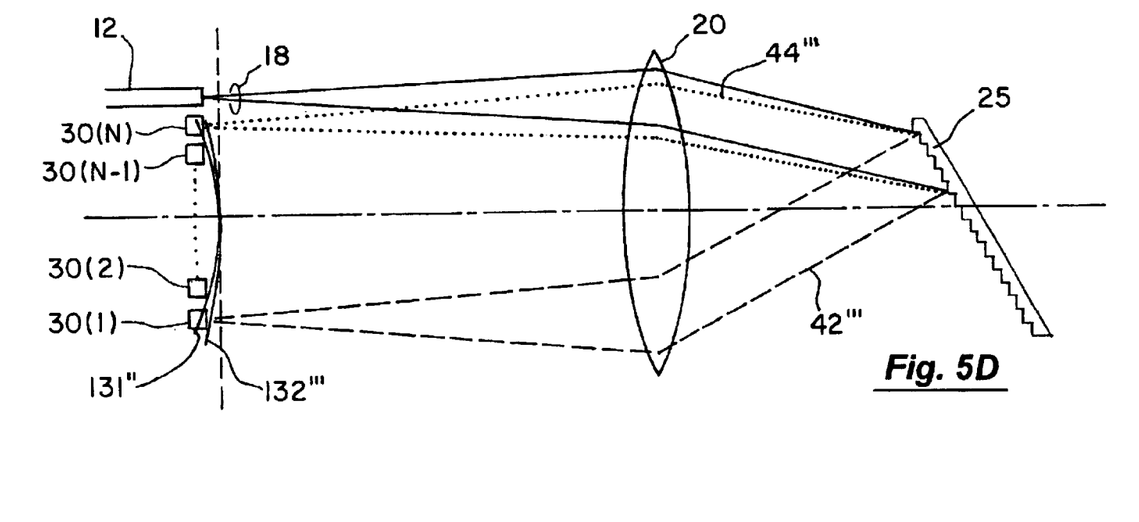
FIG. 5D is a schematic top view of a first embodiment of a wavelength router in which effects from focal length dispersion and negative field curvature compensate for each other.

The effect is similar for negative field curvatures, except that positioning the input port 12 proximate the longest wavelength retroreflector 30(N) flattens the focal field and positioning the input port 12 proximate the shortest wavelength retroreflector 30(1) increases the optical aberration. FIG. 5C illustrates the optical paths when the input port 12 is positioned proximate the shortest wavelength retroreflector 30(1). The monochromatic focal field 131" resulting from negative field curvature is distorted to curve 132" so that foci for the long- and short-wavelength spectral bands are farther apart. FIG. 5D illustrates the optical paths when the input port 12 is instead positioned proximate the longest wavelength retroreflector 30(N). In this case, the focal-length-dispersion and negative-field-curvature effects compensate to limit the optical aberration.

The same focal-field flattening effect may also be used in embodiments in which the lens 20 is replaced with a reflective mirror, such as the multipass solid-glass embodiment of a wavelength router described with respect to FIG. 3. This embodiment also positions the input port 12 in the same plane as the array of retroreflectors. By positioning the input port 12 proximate the short-wavelength retroreflector rather than the long-wavelength retroreflector, field curvature aberration is reduced by exploiting the effect of wavelength dispersion. This may also be done for both positive and negative field curvatures by positioning the input port 12 proximate the shortest wavelength retroreflector 30(1) for positive field curvature and proximate the longest wavelength retroreflector 30(N) for negative field curvature.

The same principles also operate when the input port 12 is in a different plane from the array of retroreflectors 30, such as the wavelength router described with respect to FIGS. 2A–2B. FIGS. 6A–6D illustrate with a schematic top view the paths followed by the a short-wavelength and long-wavelength spectral beams when the input port 12 is configured in two different positions for optical arrangements with positive and negative field curvatures. The position of the input port 12 may be defined as being in a plane parallel to that containing the array of retroreflectors 30.

Figure 6A:
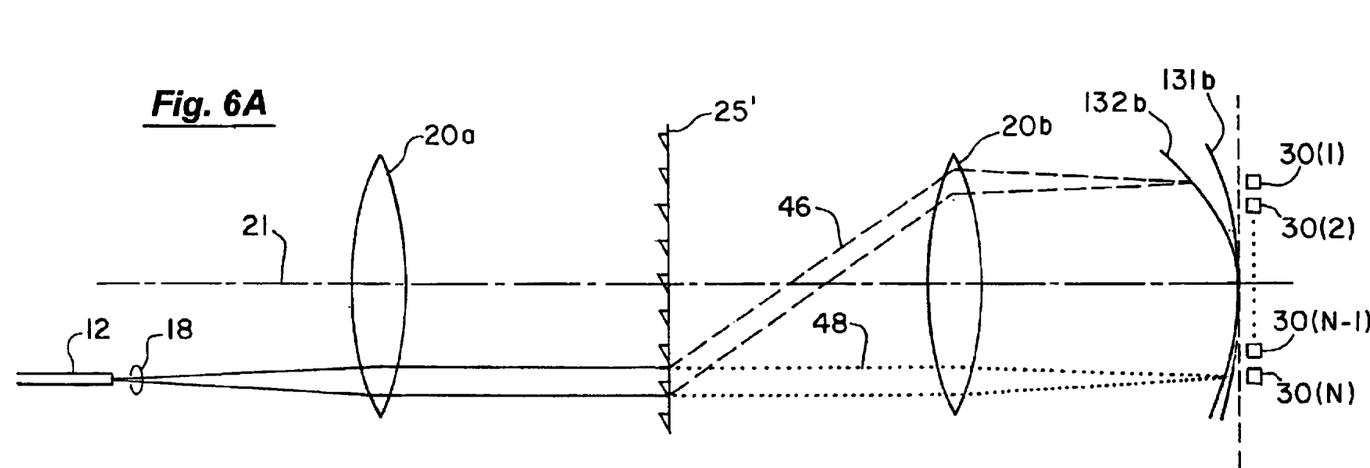
FIG. 6A is a schematic top view of a second embodiment of a wavelength router in which effects from focal length dispersion and positive field curvature act constructively.
Figure 6B:
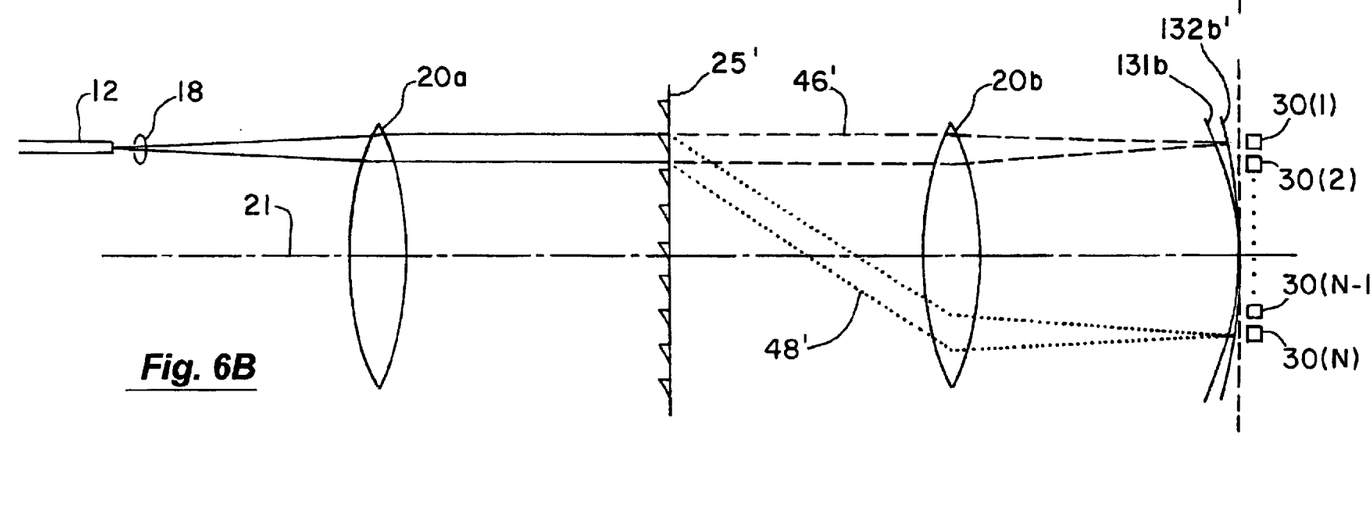
FIG. 6B is a schematic top view of a second embodiment of a wavelength router in which effects from focal length dispersion and positive field curvature compensate for each other.
Figure 6C:
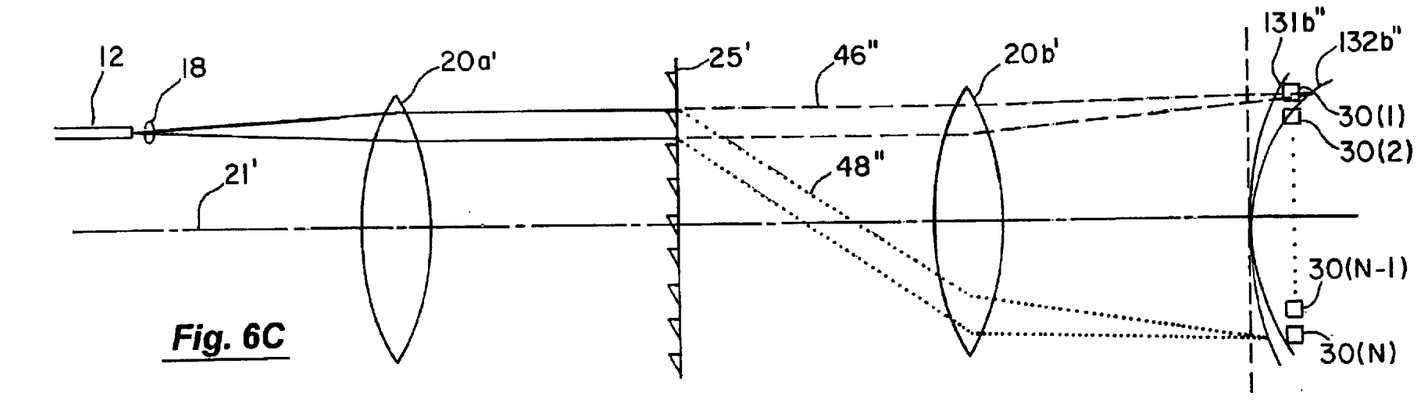
FIG. 6C is a schematic top view of a second embodiment of a wavelength router in which effects from focal length dispersion and negative field curvature act constructively.
Figure 6D:
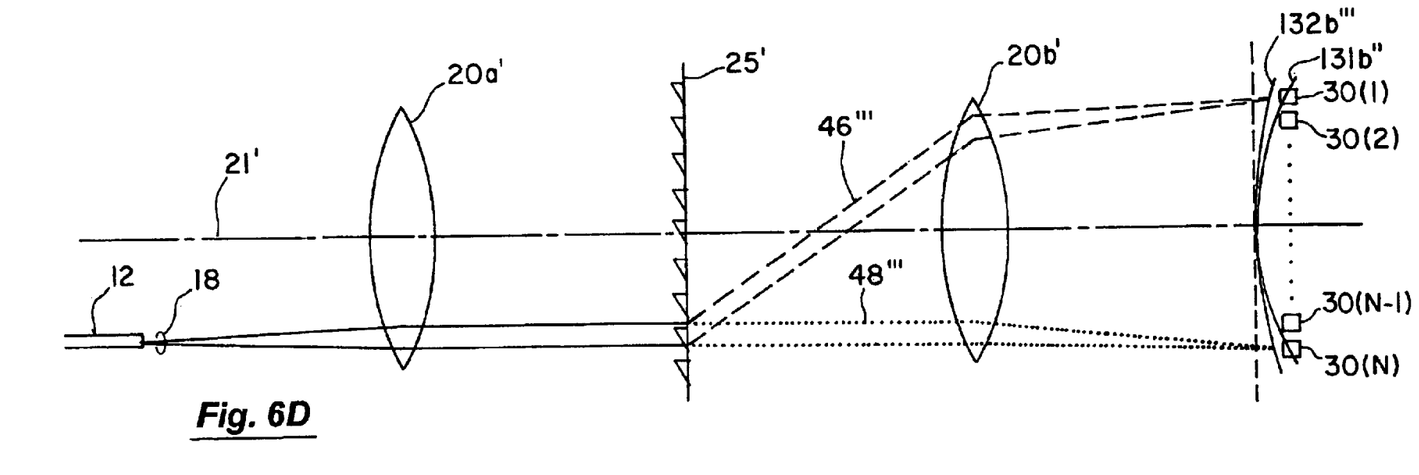
FIG. 6D is a schematic top view of a second embodiment of a wavelength outer in which effects from focal length dispersion and negative field curvature compensate or each other.

FIGS. 6A and 6C illustrate configurations in which the arrangement causes increased distortion of the focal field while FIGS. 6B and 6D illustrate configurations in which the focal field is flattened. Thus, in the embodiment shown in FIG. 6A (for positive field curvature), the input port 12 is displaced from the symmetry axis 21 of the lenses 20a and 20b by the same amount and direction as is the retroreflector designated for long-wavelength spectral bands, labeled 30(N). A similar arrangement is used for negative field curvature in FIG. 6C, where the input port 12 is displaced from the symmetry axis 21' of the lenses 20a' and 20b' by the same amount and direction as is the retroreflector designated for short-wavelength spectral bands, labeled 30(1).

Conversely, in the embodiment shown in FIG. 6B (for positive field curvature), the input port 12 is displaced from the symmetry axis 21 in the same manner as is the retroreflector designated for short-wavelength spectral bands, labeled 30(1). FIG. 6D shows the corresponding arrangement for negative field curvature in which the input port 12 is displaced from the symmetry axis 21' in the same manner as is the retroreflector designated for long-wavelength spectral bands, labeled 30(N). The monochromatic focal field for optical signals focused by lens 20b with positive field curvature is denoted in FIGS. 6A and 6B by reference numeral 131b; similarly, the monochromatic focal field for optical signals focused by lens 20b' with negative field curvature is denoted in FIGS. 6C and 6D by reference numeral 131b".

The beam path for the short-wavelength spectral band (~1530 nm for teleconmnunications applications) is shown with dashed lines in each of FIGS. 6A–6D, denoted with reference numerals 46, 46', 46", and 46'" respectively. The long-wavelength (~1565 nm for telecommunications applications) beam path is shown with dotted lines and denoted with reference numerals 48, 48', 48", and 48'" respectively in FIGS. 6A–6D. When the position of the input port 12 reflects the position of the long-wavelength retroreflector 30(N) and the field curvature is positive, as in FIGS. 6A, the optical aberration is increased as a result of focal length dispersion and positive field curvature acting constructively to produce a distorted locus of foci 131b. When that position instead reflects the position of the short-wavelength retroreflector 30(1) and the field curvature is positive, as in FIG. 6B, the positive field curvature aberration is mitigated by the countervailing effect of focal length dispersion to produce a flattened focal field 132b'. Similarly, when the field curvature is negative and the input port 12 is positioned to reflect the position of the short-wavelength retroreflector 30(1), as in FIG. 6C, the optical aberration is increased as a result of focal length dispersion and negative field curvature acting constructively to produce a distorted locus of foci 132b". Finally, for the circumstance shown in FIG. 6D, where the field curvature is negative and the input port 12 is positioned to reflect the position of the long-wavelength retroreflector 30(N), a flattened focal field 132b'" is produced.

Such an optical configuration finds applications for other arrangements that intentionally focus spectral bands with different wavelengths. For example, such focusing may be onto a routing plane as described above, with an array of routing elements comprising, for example, mirrors, liquid-crystal modulators, or microelectromechanical (MEMS) systems. In other embodiments, spectral bands with different wavelengths are intentionally focused on a detector plane, which may comprise, for example, film, an array of charge-coupled devices (CCD's), or an array of complementary metal-oxide semiconductor (CMOS) imagers.

Having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. An optical arrangement for receiving, at an input port, a light beam having a plurality of spectral bands and directing subsets of the spectral bands along optical paths to respective optical elements configured as a substantially planar array, the optical arrangement comprising:
    a dispersive element configured to diffract the light beam, after it has been collimated, into a plurality of angularly separated beams corresponding to the plurality of spectral bands; and
    a first focusing element disposed with respect to the dispersive element and with respect to the substantially planar array of optical elements such that dispersion in the focal distance of the first focusing element for different angularly separated beams compensates for field curvature aberration caused by the first focusing element.

2. The optical arrangement recited in claim 1 wherein the dispersive element is a reflective diffraction grating and wherein the first focusing element is further disposed with respect to the reflective diffraction grating to collimate the light beam before the light beam encounters the reflective diffraction grating.

3. The optical arrangement recited in claim 2 wherein the input port is substantially coplanar with the array of optical elements.

4. The optical arrangement recited in claim 3 wherein the field curvature aberration is a positive field curvature aberration and the input port is positioned proximate the optical element corresponding to the shortest-wavelength spectral band, with optical elements corresponding to progressively longer-wavelength spectral bands positioned progressively farther from the input port.

5. The optical arrangement recited in claim 3 wherein the field curvature aberration is a negative field curvature aberration and the input port is positioned proximate the optical element corresponding to the longest-wavelength spectral band, with optical elements corresponding to progressively shorter-wavelength spectral bands positioned progressively farther from the input port.

6. The optical arrangement recited in claim 2 wherein the first focusing element is a lens disposed between the input port and the reflective diffraction grating.

7. The optical arrangement recited in claim 2 wherein the first focusing element is a curved reflector disposed to intercept light from the input port.

8. The optical arrangement recited in claim 1 wherein the dispersive element is a transmissive diffraction grating, the optical arrangement further comprising a second focusing element disposed with respect to the transmissive diffraction grating to collimate the light beam before the light beam encounters the transmissive diffraction grating.

9. The optical arrangement recited in claim 8,
    wherein the field curvature aberration is a positive field curvature aberration,
    wherein the first and second focusing elements have a common symmetry axis that is substantially orthogonal to the array of optical elements,
    wherein the input port is positioned within a plane parallel to the array of optical elements, displaced from the symmetry axis by an amount substantially equal to a displacement from the symmetry axis by the optical element corresponding to the shortest-wavelength spectral band, and
    wherein optical elements corresponding to progressively longer-wavelength spectral bands are progressively farther from the optical element corresponding to the shortest-wavelength spectral band.

10. The optical arrangement recited in claim 8,
    wherein the field curvature aberration is a negative field curvature aberration,
    wherein the first and second focusing elements have a common symmetry axis that is substantially orthogonal to the array of optical elements, wherein the input port is positioned within a plane parallel to the array of optical elements, displaced from the symmetry axis by an amount substantially equal to a displacement from the symmetry axis by the optical element corresponding to the longest-wavelength spectral band, and wherein optical elements corresponding to progressively shorter-wavelength spectral bands are progressively farther from the optical element corresponding to the longest-wavelength spectral band.

11. The optical arrangement recited in claim 8 wherein the first focusing element is a lens disposed between the transmissive diffraction grating and the array of optical elements and the second focusing element is a lens disposed between the input port and the transmissive diffraction grating.

12. The optical arrangement recited in claim 1 wherein the dispersive element is a prism, the optical arrangement further comprising a second focusing element disposed with respect to the prism to collimate the light beam before the light beam encounters the prism.

13. The optical arrangement recited in claim 1 wherein the dispersive element is a grism.

14. The optical arrangement recited in claim 1 wherein the array of optical elements comprises an array of routing elements.

15. The optical arrangement recited in claim 14 wherein each such routing element is dynamically configurable to direct a given angularly separated beam to different ones of a plurality of output ports depending on its state.

16. The optical arrangement recited in claim 1 wherein the array of optical elements comprises an array of detector elements.

17. The optical arrangement recited in claim 1 wherein the dispersive element is angularly positioned with respect to the first focusing element to minimize the field curvature aberration.

18. The optical arrangement recited in claim 1 wherein the first focusing element is configured to have a specific field curvature aberration based on an angular position of the dispersive element with respect to the first focusing element.

19. A wavelength router for receiving, at an input port, light having a plurality of spectral bands and directing subsets of the spectral bands to respective ones of a plurality of output ports, the wavelength router comprising:

a routing mechanism having a substantially planar array of dynamically configurable routing elements, each of which is structured to direct a given spectral band to different output ports, depending on a state of such dynamically configurable routing element; and a free-space optical train disposed between the input port and the output ports providing optical paths for routing the spectral bands, the optical train including:

a dispersive element disposed to intercept light traveling from the input port and to diffract it into a plurality of angularly separated beams corresponding to the plurality of spectral bands, the optical train being configured so that light encounters the dispersive element before reaching any of the output ports; and a first focusing element disposed with respect to the dispersive element and with respect to the substantially planar array of dynamically configurable routing elements such that dispersion in the focal distance of the first focusing element for different angularly separated beams compensates for field curvature aberration caused by the first focusing element.

20. The wavelength router recited in claim 19 wherein the input port is located at the end of an input fiber.

21. The wavelength router recited in claim 19 wherein the output ports are located at respective ends of a plurality of output fibers.

22. The wavelength router recited in claim 19 wherein the routing mechanism includes a plurality of reflecting elements, each associated with a respective one of the spectral bands.

23. The wavelength router recited in claim 19 wherein the dispersive element is a reflective diffraction grating and wherein the first focusing element is further disposed with respect to the reflective diffraction grating to collimate light from the input port before encountering the reflective diffraction grating.

24. The wavelength router recited in claim 23 wherein the input port is substantially coplanar with the array of dynamically configurable routing elements.

25. The wavelength router recited in claim 24 wherein the field curvature aberration is a positive field curvature aberration and the input port is positioned proximate the routing element corresponding to the shortest-wavelength spectral band, with routing elements corresponding to progressively longer-wavelength spectral bands positioned progressively farther from the input port.

26. The wavelength router recited in claim 24 wherein the field curvature aberration is a negative field curvature aberration and the input port is positioned proximate the routing element corresponding to the longest-wavelength spectral band, with routing elements corresponding to progressively shorter-wavelength spectral bands positioned progressively farther from the input port.

27. The wavelength router recited in claim 23 wherein the first focusing element is a lens disposed between the input port and the reflective diffraction grating.

28. The wavelength router recited in claim 23 wherein the first focusing element is a curved reflector disposed to intercept light from the input port.

29. The wavelength router recited in claim 19 wherein the dispersive element is a transmissive diffraction grating, the free-space optical train further comprising a second focusing element disposed with respect to the transmissive diffraction grating to collimate light from the input port before encountering the transmissive diffraction grating.

30. The wavelength router recited in claim 29, wherein the field curvature aberration is a positive field curvature aberration, wherein the first and second focusing elements have a common symmetry axis that is substantially orthogonal to the array of dynamically configurable routing elements, wherein the input port is positioned within a plane parallel to the array of dynamically configurable routing elements, displaced from the symmetry axis by an amount substantially equal to a displacement from the symmetry axis by routing element corresponding to the shortest-wavelength spectral band, and wherein routing elements corresponding to progressively longer-wavelength spectral bands are progressively farther from the routing element corresponding to the shortest-wavelength spectral band.

31. The wavelength router recited in claim 29, wherein the field curvature aberration is a negative field curvature aberration, wherein the first and second focusing elements have a common symmetry axis that is substantially orthogonal to the array of dynamically configurable routing elements, wherein the input port is positioned within a plane parallel to the array of dynamically configurable routing elements, displaced from the symmetry axis by an amount substantially equal to a displacement from the symmetry axis by routing element corresponding to the longest-wavelength spectral band, and wherein routing elements corresponding to progressively shorter-wavelength spectral bands are progressively farther from the routing element corresponding to the longest-wavelength spectral band.

32. The wavelength router recited in claim 29 wherein the first focusing element is a lens disposed between the transmissive diffraction grating and the array of dynamically configurable routing elements and the second focusing element is a lens disposed between the input port and the transmissive diffraction grating.

33. The optical arrangement recited in claim 19 wherein the dispersive element is angularly positioned with respect to the first focusing element to minimize the field curvature aberration.

34. The optical arrangement recited in claim 19 wherein the first focusing element is configured to have a specific field curvature aberration based on an angular position of the dispersive element with respect to the first focusing element.

35. An optical arrangement for receiving, at an input port, a light beam having a plurality of spectral bands and directing subsets of the spectral bands along optical paths to respective optical elements configured as a substantially planar array, the optical arrangement comprising:

means for collimating the light beam;

means for diffracting the collimated light beam into a plurality of angularly separated beams corresponding to the plurality of spectral bands; and means for focusing the angularly separated beams onto respective ones of the optical elements, such means for focusing disposed with respect to the means for diffracting such that dispersion in the focal distance of such means for focusing compensates for field curvature aberration caused by such means for focusing.

36. The optical arrangement recited in claim 35, wherein the field curvature aberration is a positive field curvature aberration, wherein the means for focusing has a symmetry axis that is substantially orthogonal to the array of optical elements, wherein the input port is positioned within a plane parallel to the array of optical elements, displaced from the symmetry axis by an amount approximately equal to a displacement from the symmetry axis by the optical element corresponding to the shortest-wavelength spectral band, and wherein optical elements corresponding to progressively longer-wavelength spectral bands are progressively farther from the optical element corresponding to the shortest-wavelength spectral band.

37. The optical arrangement recited in claim 35, wherein the field curvature aberration is a negative field curvature aberration, wherein the means for focusing has a symmetry axis that is substantially orthogonal to the array of optical elements, wherein the input port is positioned within a plane parallel to the array of optical elements, displaced from the symmetry axis by an amount approximately equal to a displacement from the symmetry axis by the optical element corresponding to the longest-wavelength spectral band, and wherein optical elements corresponding to progressively shorter-wavelength spectral bands are progressively farther from the optical element corresponding to the longest-wavelength spectral band.

38. The optical arrangement recited in claim 36 wherein the input port is substantially coplanar with the array of optical elements.

39. The optical arrangement recited in claim 35 wherein the array of optical elements comprises an array of dynamically configurable routing elements, each of which may direct a given angularly separated beam to different output ports depending on its state.

40. A method for directing spectral bands of a light beam having a plurality of such spectral bands along optical paths to respective optical elements configured as a substantially planar array, the method comprising:

receiving the light beam at an input port;

propagating the light beam from the input port such that it intercepted by a dispersive element;

separating the light beam with the dispersive element into a plurality of angularly separated beams corresponding to the plurality of spectral bands; and focusing a subset of the plurality of angularly separated beams onto respective ones of the optical elements with a first focusing element disposed with respect to the dispersive element and with respect to the substantially planar array of optical elements such that dispersion in the focal distance for different spectral bands compensates for field curvature aberration.

41. The method recited in claim 40 further comprising collimating the light beam before it is intercepted by the dispersive element.

42. The method recited in claim 41, wherein the field curvature aberration is a positive field curvature aberration, wherein the input port is positioned within a plane parallel to the array of optical elements, displaced from a symmetry axis orthogonal to the array of optical elements by an amount approximately equal to a displacement from the symmetry axis by the optical element corresponding to the shortest-wavelength spectral band, and wherein optical elements corresponding to progressively longer-wavelength spectral bands are progressively farther from the optical element corresponding to the shortest-wavelength spectral band.

43. The method recited in claim 41, wherein the field curvature aberration is a negative field curvature aberration, wherein the input port is positioned within a plane parallel to the array of optical elements, displaced from a symmetry axis orthogonal to the array of optical elements by an amount approximately equal to a displacement from the symmetry axis by the optical element corresponding to the longest-wavelength spectral band, and wherein optical elements corresponding to progressively shorter-wavelength spectral bands are progressively farther from the optical element corresponding to the longest-wavelength spectral band.

44. The method recited in claim 42 wherein the input port is substantially coplanar with the array of optical elements.

45. The method recited in claim 44 wherein separating the light beam comprises simultaneously diffracting and reflecting the light beam.

46. The method recited in claim 42 wherein separating the light beam comprises simultaneously diffracting and transmitting the light beam.

47. The method recited in claim 41 further comprising dynamically routing each of the focused subset of angularly separated beams to different output ports depending on a state of the corresponding optical element.

48. The method recited in claim 41 further comprising detecting each of the focused subset of angularly separated beams.

49. The method recited in claim 40 further comprising angularly positioning the dispersive element with respect to the first focusing element to minimize the field curvature aberration.

50. The method recited in claim 40 further comprising designing the first focusing element to have a specific field curvature aberration based on an angular position of the dispersive element with respect to the first focusing element.

* * * * *